United States Patent [19]

Sygnator

[11] Patent Number: 4,565,475
[45] Date of Patent: Jan. 21, 1986

[54] DRILL POINT MILLING MACHINE AND METHOD

[75] Inventor: Henry A. Sygnator, Arlington Heights, Ill.

[73] Assignee: Illinois Tool Works Inc., Chicago, Ill.

[21] Appl. No.: 471,919

[22] Filed: Mar. 2, 1983

Related U.S. Application Data

[63] Continuation-in-part of Ser. No. 097,460, Nov. 26, 1979, abandoned.

[51] Int. Cl.⁴ ................................................. B23G 9/00
[52] U.S. Cl. ...................... 409/131; 10/10 R;
   10/20.5; 409/192; 409/198; 409/213
[58] Field of Search ............ 10/10 R, 20.5, 21, 9;
   408/70; 407/6.2; 411/387; 409/132, 189, 192, 197, 198, 199, 203, 217, 221, 222, 223

[56] References Cited

U.S. PATENT DOCUMENTS

| | | | |
|---|---|---|---|
| 1,989,667 | 2/1935 | Covill | 407/62 |
| 3,280,412 | 10/1966 | Hanneman et al. | 408/70 X |
| 3,422,472 | 1/1969 | Pomernacki | 10/10 R |
| 3,738,218 | 6/1973 | Gutshall | 10/10 R X |
| 3,747,143 | 7/1973 | Eager | 10/10 R |
| 3,780,389 | 12/1973 | Lindstrom | 10/10 R |
| 3,933,075 | 1/1976 | Peterson | 10/10 R X |
| 4,138,754 | 2/1979 | Baer | 10/9 X |
| 4,395,173 | 7/1983 | Sygnator | 411/387 |

FOREIGN PATENT DOCUMENTS

| | | | |
|---|---|---|---|
| 567900 | 10/1975 | Switzerland | 407/6 2 |
| 26071 | of 1913 | United Kingdom | 411/902 |

*Primary Examiner*—William R. Briggs
*Assistant Examiner*—Glenn L. Webb
*Attorney, Agent, or Firm*—David I. Roche; T. W. Buckman

[57] ABSTRACT

A method and apparatus for milling drill points in screw blanks. Form relieved milling cutters are rotated at unusually high speeds to produce high performance screws at improved rates of production. The cutters can be adjusted in a simple manner to achieve variations in drill point geometry, and the speed of the cutters can be controlled to carefully maintain the quality of the products and maximize the life of the cutters.

6 Claims, 13 Drawing Figures

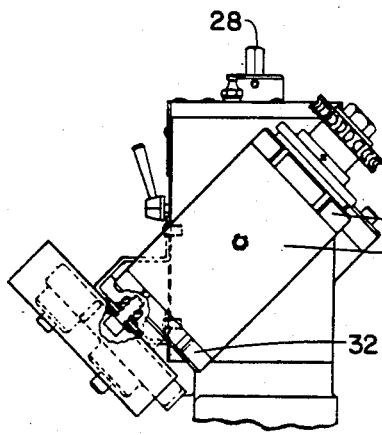
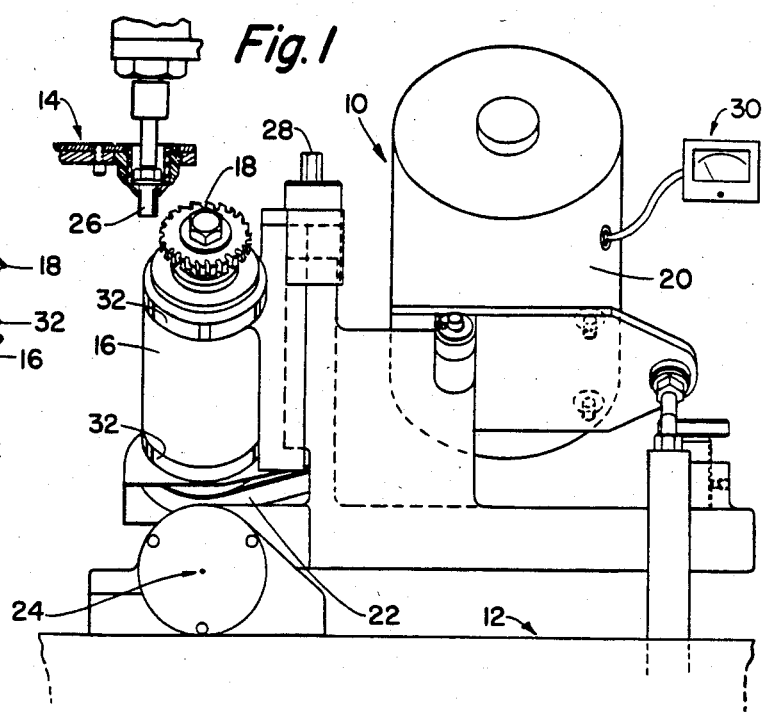
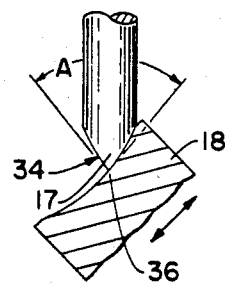
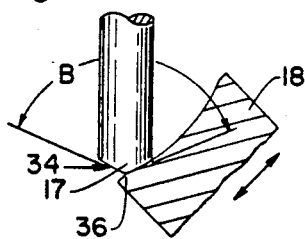
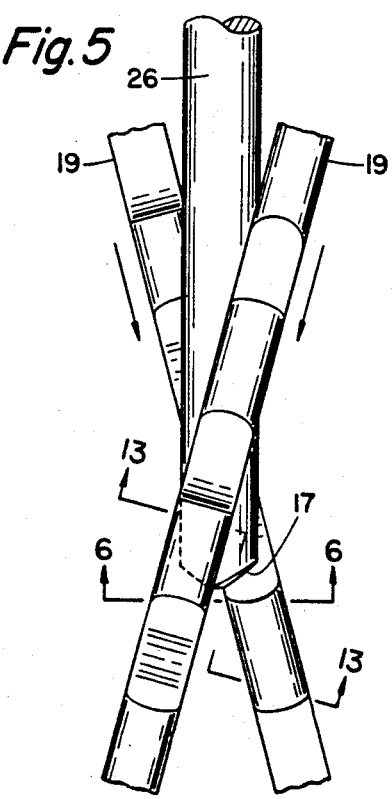
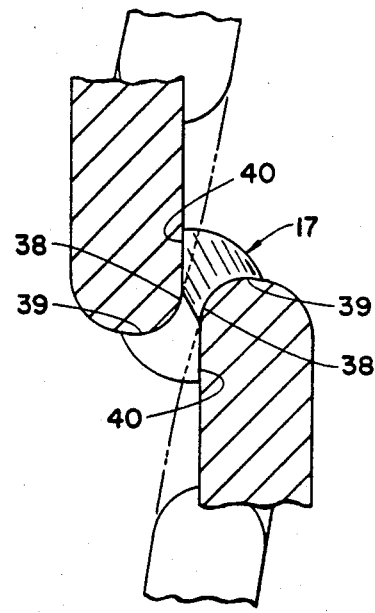

DRILL POINT MILLING MACHINE AND METHOD

This application is a continuation-in-part and a divisional application of a parent application, Ser. No. 097,460 filed Nov. 26, 1979 abandoned.

BACKGROUND AND SUMMARY OF THE INVENTION

The present invention relates to a method and an apparatus for making drill screws, and more particularly to a novel method and apparatus for repeatably making high performance drill screws.

The invention can be considered to be an improvement to a method and apparatus which is the subject of U.S. Pat. No. 3,280,412, wherein many of the fundamental techniques used in the present invention are described. The contents of U.S. Pat. No. 3,280,412 are incorporated herein by reference. The art of forming milled drill points on drill screws has generally involved a frame structure which carries a conveyor or turret which is adapted to convey successive screw blanks to various work stations. The screw blanks have elongated shanks exposed beneath the turret. It is upon these exposed blanks that various operations are performed. Methods and apparatus of the prior art generally utilize milling saws. Such methods and apparatus have been generally successful and have enabled commercially acceptable screws to be produced in an efficient manner.

The present invention involves a novel method and apparatus for milling drill points in screw blanks. Form relieved milling cutters are rotated at unusually high speeds to produce high performance screws at improved rates of production. The cutters can be adjusted in a simple manner to achieve variations in drill point geometry, and the speed of the cutters can be controlled to carefully maintain the quality of the products and maximize the life of the cutters.

It is an important object of the present invention to provide a method and apparatus for producing drilling screws with improved accuracy and improved production rates.

It is a further object of the present invention to provide a method and apparatus which allows the production of drill screws which have drilling tips with varying geometries.

A more specific object of the present invention is to provide an apparatus of the above described type having novel means for forming drill screws having curvilinear surfaces milled therein.

Other objects and advantages of the present invention will become apparent from the following description read in conjunction with the accompanying drawings.

DESCRIPTION OF THE DRAWINGS

FIGS. 1 and 2 are elevational views of a portion of an apparatus incorporating some of the features of the present invention;

FIGS. 3 and 4 are enlarged elevational views showing a screw and a rotary milling cutter adjusted to form drilling tips in accordance with the present invention;

FIG. 5 is an elevational view showing milling cutters used to form flutes in a blank in accordance with the present invention;

FIG. 6 is a sectional view taken along line 6—6 of FIG. 5;

DETAILED DESCRIPTION OF THE INVENTION

Figure 7:
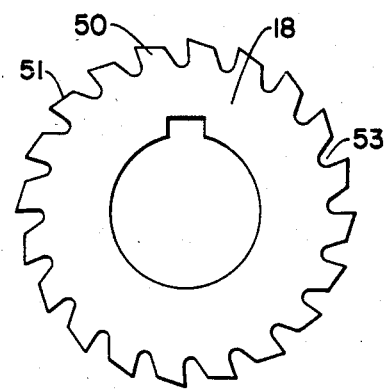
FIGS. 7 and 8 are elevational views of a milling cutter used to form the tips of drill screws in accordance with the present invention.

Referring now to the drawings wherein like parts are designated by the same numerals throughout the various figures, FIG. 1 shows a portion of a drill pointing machine with a pointing unit assembly 10 mounted on a base 12 adjacent an indexable turret 14. The assembly 10 comprises an axially adjustable spindle cartridge 16 which carries a milling cutter 18. An electric motor 20 is adapted to drive the cutter 18 by means of a roller chain 22. The assembly 10 is adapted to pivot about a point 24 so as to cause the cutter 18 to engage a screw blank 26 mounted in the turret 14. The assembly 10 further includes a vertical adjusting nut 28 adapted to raise and lower the height of the cutter 18. The position of the cutter 18 along its axis is controllable by means of the spindle adjusting rings 32. The pointing unit assembly 10 preferably includes a variable control 30 which is used to vary the speed at which the motor 20 rotates the cutter 18. It should also be noted that the pivoting movement of the assembly 10 is controlled by a cam member (not shown) beneath the support 12. The movement of the unit 10 and the resulting lateral movement of the cutter 18 is timed such that the cutter 18 strikes the bottom portion of the blank 26 between indexing movements of the turret 14. Since the movement of the unit is cam operated the rate at which the cutter engages the blank 26 varies depending upon the desired output of the entire pointing machine.

By controlling the rotational speed of the cutter 18 with the control 30, and by controlling the rate at which the assembly 10 pivots into engagement with the blank 26 an operator can maintain virtually complete control over the cut per tooth of the milling cutter 18. This is significant because variations in the quality of the material comprising the blank 26 often result in variations in the way burrs aare formed. It has been found that strategically locating the burrs which result from the milling operation can result in improved performance depending upon the extent to which the screw is plated and the material used in the plating. Applicant's co-pending application Ser. No. 279,103 filed June 30, 1981 pertains to burr formation and is incorporated herein by reference. Another significant feature which is the result of having the ability to control the cut per tooth of the milling cutters 18 is the ability to maximize the life of the cutter, while at the same time maximizing output. Since the hardness of raw materials may vary, it may be desirable to lower or increase the cut per tooth of the cutters at the expense of output in order to make the best use of the cutters.

FIG. 2 more clearly shows the cutter holding spindle cartridge 16. The axial position of the cutter 18 can be adjusted along the axis of the cutter by rotating the spindle adjusting rings 32. The vertical position of the cutter 18 can be adjusted by rotating the nut 28, because movement of the nut vertically raises or lowers the entire cartridge 16.

FIGS. 3 and 4 show the significance of the ability to vary the axial location of the cutter 18, particularly in connection with the use of a concave milling cutter. By forming a drilling point 17 on the blank 26 with the upper portion of the concave milling cutter 18, the length of the heel portion 34 is maximized and the included angle "A" formed by tangents to the heel portion at the tip 36 of the point 17 is minimized. In contrast, FIG. 4 shows the formation of the point 17 with the lower portion of the concave milling cutter 18. In this case the length of the heel portion 34 is minimized and the included angle "B" of the point 17 is maximized. It should be noted that this is easily achieved by simply moving the cutter 18 along its axis in the directions of the arrows in FIGS. 3 and 4, by adjusting the spindle adjusting rings 32 and in some cases adjusting the vertical positions of the cutter with the adjusting nut 28. It should be noted that the term "drilling point" as used in this specification is intended to include the combination of fluting and heel surfaces.

FIGS. 5 and 6 show portions of an apparatus used to form the flute portions of drill screws in accordance with the present invention. In these figures convex milling cutters 19 are used to form curved surfaces in the screw blank 26. By using cutters with a concave profile the geometry of the point 17 is comprised of compound surfaces 38 comprised of curved portions 39 and straight portions 40. The formation of flutes in drilling screws in the past was accomplished by substantially flat profiled milling saws. By using convex milling cutters the discontinuities in the cross-sectional configuration of flutes of the prior art can be avoided. As a result a drill point of significantly stronger geometry can be achieved by using milling cutters in accordance with the present invention. It should be noted however that the use of milling cutters necessitates significantly greater hold down forces to avoid movement of the blank during the milling operation. Both of the fluting cutters 19 contact the blank with generally downward force, but since they are angled at about 15 degrees with respect to vertical and since they contact opposite sides of the blank their horizontal components combine to impart significant rotational force to the blank. And since there are relatively few teeth on the cutters compared to the saws used in the prior art, it has been found that more than twice the amount of hold down force is required. It has been discovered that hold down forces of between 200 and 350 pounds may be required, depending upon the speed of rotation of the cutters and the number of cutting teeth on the cutter. In the preferred embodiment a hold down pin actuated by air pressure is used to hold the screw blank in a collet. The pin is part of a piston mounted in a cylinder which is connected to a pressure line capable of selectively exerting the required hold down forces. Alternatively, mechanical or hydraulic holding means could be used in place of the pneumatic means discussed above.

Figure 8:
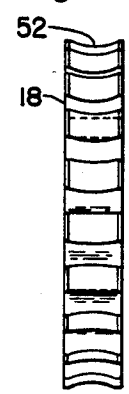
Figure 9:
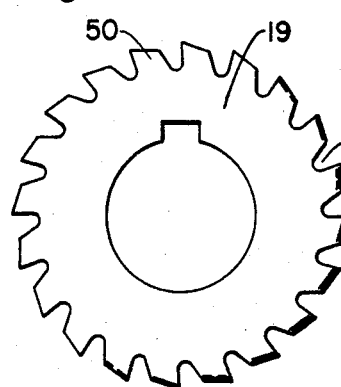
FIGS. 9 and 10 are elevational views of a milling cutter used to form the flutes of drill screws in accordance with the present invention.
Figure 10:
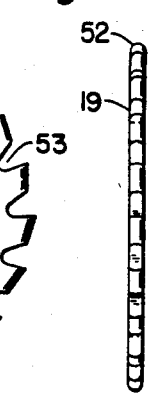

FIGS. 7 and 8 show the preferred form of milling cutter 18 used to form the heel portions of screw blanks while FIGS. 9 and 19 show the preferred form of milling cutters used to form flutes in screw blanks. The teeth 50 have relieved portions 51 to prevent friction, curved cutting edges 52 to create the desired forms in the screw blanks, and significant spaces 53 between the teeth to prevent build-up of removed material. It has been found that by using cutters between 20 and 32 teeth and diameters between 2.0 and 3.5 inches, and by carefully controlling the rotational speed and thereby the cut per tooth of the milling cutters, the life of the cutters can be maximized; while at the same time the quality of the end product can be improved in terms of accuracy, repeatability of performance, and the output of the drill pointing machine can be improved. This is a result, at least in part, because, as the output of the machine is increased, the speed at which the cutters are moved into engagement with the blank and the resulting cut per tooth of the cutters would be excessive without the ability to increase the rotational speed of the cutters to compensate for the increased amount of material cut by the tooth. By having relatively few teeth on the perimeter of the cutter the extent to which each tooth may be sharpened will be increased because the sharpening of the cutters is accomplished by grinding the faces of the teeth rather than by profile grinding.

It has also been found that potential interference between the fluting cutters 19 and the turret 14 makes the use of small diameter cutters desirable, especially when milling short screw blanks because in those cases only a small amount of the screw blank is exposed. It has been determined that the cutters described above as having diameters as small as 2.00 inches can be used with satisfactory results in terms of cutter life and burr formation as well as output rate and quality control with screws as short as 5/16 inches.

By using small diameter from relieved milling cutters with relatively few teeth, and by rotating such cutters at unusually high rates which approach 1000 surface feet per minute, optimum use can be made of the cutters and increased rates of production can be achieved without sacrificing quality.

Figure 11:
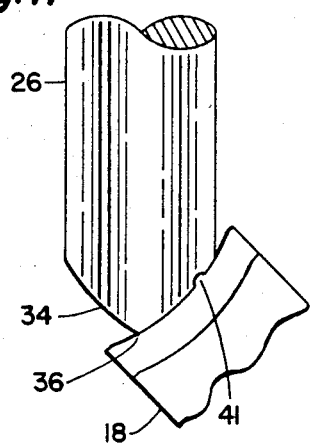
FIGS. 11 and 12 are enlarged elevational views of alternative embodiments of milling cutters used to form drilling points in screw blanks in accordance with the present invention.
Figure 12:
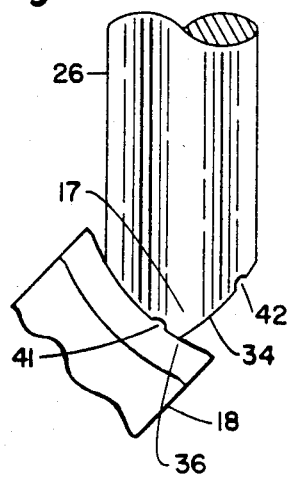

It should also be noted that in some cases it may be desirable to include a chip breaking feature on either the pointing cutter 18 or the fluting cutter 19. FIGS. 11 and 12 show pointing cutters 18 with ribs 41 formed on each tooth thereof. The ribs are aligned on the cutter to form a single trough 42 on each heel portion 34 of the tip 17 of the blank 26. However, in the preferred embodiment of a screw incorporating a chip breaking feature on the heel portions, the troughs on opposite heel portions are not equidistant from the center of the blank so that in a workpiece the cutting edge on one side of the screw will remove the rib formed by the trough on the opposite side of the screw. It should be noted that by placing a rib in an off-center position on the pointing cutter and by using cutters in the manner shown in FIGS. 11 and 12 where the rib 41 is on the upper portion when forming one heel portion and the rib 41 is on the lower portion when forming the other heel portion, a single form of cutter can be used to without the need for right and left hand forms.

Figure 13:
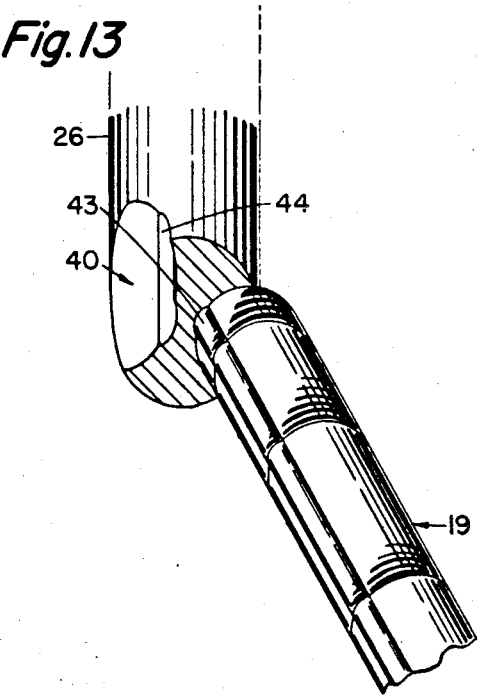
FIG. 13 is a view in partial section taken along line 13—13 in FIG. 5 showing an alternative embodiment of a milling cutter used to form flutes in a screw blank in accordance with present invention.

FIG. 13 shows a cutter 19 used to form a chip breaking feature in the flutes 40 of a blank 26. A rib 43 is used to form a trough 44 in the flute 40. The rib 43 is comprised of a plurality of segments in alignment on the teeth of the cutter 19. Alternatively a trough could be formed on the cutter in order to form a rib in the flute. Similarly such an alternative technique could be used in forming the chip breaking feature on the heel.

By using milling cutters, drill pointing apparatus and methods in accordance with the present invention it is possible to produce high performance drill screws within exacting tolerances at rates of production which are significantly greater than were previously obtainable.

While the preferred embodiment of the present invention has been shown and described, it is to be understood that variations in structure, obvious to those having ordinary skill in the art, and are intended to fall within the spirit and scope of the appended claims.

I claim:

1. An apparatus for consistently producing drill screws within exacting tolerances, said screws having drilling tips with at least two flutes and said apparatus including a rotating turret for intermittently conveying successive screw blanks having exposed shanks along a path of travel and at least one cam operated milling station adjacent said path, said station including a motor driven spindle for mounting rotary cutting tools used to form said drilling tips, said cutting tools including at least one pointing cutter for forming a heel surface on said screw blank, wherein the improvement comprises:
   (a) means for forming said drilling tips which include a plurality of form relieved milling cutters, said pointing cutter being one of said plurality of milling cutters and, said pointing cutter having a concave profile to provide means for varying the size and orientation of said heel surface movement parallel to the axis of rotation of said pointing cutter and meant to adjust the axial position of said pointing cutter,
   (b) means for rotating said cutters at a rate of approximately 1000 surface feet per minute and,
   (c) means for firmly holding said screw blanks against uplift and rotational forces resulting from interaction between said blanks and said cutters, said holding means being capable of exerting a downward axial force on said blanks of between 200 and 350 pounds.

2. An apparatus as described in claim 1 including means for controlling the cut per tooth of said cutting tools whereby the life of said cutters can be maximized despite variations in stock material and whereby the size and shape of burrs resulting from the formation of said tips can be controlled.

3. An apparatus as described in claim 1 wherein the means for controlling the cut per tooth of said cutters includes means for adjusting the rotational speed thereof.

4. An apparatus as described in claim 1 wherein said cutters have approximately between 20 and 32 teeth each and are between 2.0" and 3.5" diameter.

5. In a method of producing screws having drilling tips, of the type including the steps of using a rotating turret to intermittently convey successive screw blanks having head portions and axially extending shank portions along a path of travel with tips of said shanks exposed, and shaping the drilling tips of said screw blanks with a plurality of rotary milling cutters at cam operated work stations, said work stations including motor driven spindles which are rocked into engagement with said screw blanks, the improvement comprising:
   (a) using at least one form relieved milling cutter having a generally concave profile to shape heel surfaces of said drilling tips, and
   (b) adjusting the axial position of said concave profile milling cutter parallel to the axis of rotation of said milling cutter to control the size and orientation of said heel surfaces, and,
   (c) variably adjusting the cut per tooth of said cutters, and
   (d) applying an axially downward load of between 200 and 350 pounds to said successive blanks in order to prevent rotational and axial movement thereof,
   whereby the life of said cutters may be maximized and the size and shape of burrs resulting from the formation of said tips can be precisely controlled.

6. A method as described in claim 5 wherein adjusting the cut per tooth is achieved by controlling the rotational speed of said cutters.

* * * * *

UNITED STATES PATENT OFFICE
CERTIFICATE OF CORRECTION

Patent No. 4,565,475                Dated January 21, 1986

Inventor(s)  Henry A. Sygnator

It is certified that error appears in the above-identified patent and that said Letters Patent are hereby corrected as shown below:

Column 5, line 26, after "surface" insert --- by ---; and in line 28, change "meant" to --- means ---.

Signed and Sealed this

Sixth Day of May 1986

[SEAL]

Attest:

Attesting Officer

DONALD J. QUIGG

Commissioner of Patents and Trademarks